United States Patent [19]
McNamara

[11] Patent Number: 5,910,206
[45] Date of Patent: Jun. 8, 1999

[54] DRY FIRE LIMITING DEVICE FOR DEEP FRYER

[75] Inventor: Albert Charles McNamara, San Antonio, Tex.

[73] Assignee: AFC Enterprises, Inc., Atlanta, Ga.

[21] Appl. No.: 09/191,698

[22] Filed: Nov. 13, 1998

[51] Int. Cl.⁶ .................................................. A47J 37/12
[52] U.S. Cl. ............................. 99/330; 99/331; 99/337; 99/403; 126/374; 126/391
[58] Field of Search ................. 99/330, 331–333, 99/337, 338, 403–407, 410–418, 447; 126/374–376, 378, 390, 391, 387, 383, 357, 369, 343.5 A; 165/63; 219/400, 438; 392/308, 444; 210/167, DIG. 8; 426/231, 233, 438, 523, 466, 568; 431/1, 328, 329

[56] References Cited

U.S. PATENT DOCUMENTS

| | | | |
|---|---|---|---|
| 4,228,730 | 10/1980 | Schindler et al. | 99/407 |
| 4,372,980 | 2/1983 | Luebke et al. | 426/231 |
| 4,639,213 | 1/1987 | Simpson | 431/326 |
| 4,660,542 | 4/1987 | Scherer | 99/403 |
| 4,684,412 | 8/1987 | Fritzsche | 99/330 X |
| 4,848,318 | 7/1989 | Brewer | 126/390 |
| 4,913,041 | 4/1990 | Taber et al. | 126/391 |
| 4,923,705 | 5/1990 | Mottur et al. | 426/438 X |
| 5,185,168 | 2/1993 | Takahashi | 426/233 |
| 5,209,218 | 5/1993 | Daneshvar et al. | 99/403 X |
| 5,417,202 | 5/1995 | Cote | 99/403 X |
| 5,490,449 | 2/1996 | Meister et al. | 99/403 |
| 5,706,717 | 1/1998 | Barner | 99/330 |

*Primary Examiner*—Timothy F. Simone
*Attorney, Agent, or Firm*—Banner & Witcoff, Ltd.

[57] ABSTRACT

A fryer system has a fryer including a vat containing shortening. A heating device supplies heat to the vat. The fryer has a plurality of heat transfer conduits and each heat transfer conduit has an upper surface. An upper surface of a mixing plenum is located above the upper surface of the plurality of heat transfer conduits. The heat transfer conduits are connected to the mixing plenum at inlet and outlet openings in the mixing plenum. A heat sensor is positioned on the upper surface of the mixing plenum. The heat sensor triggers a device for deactivating the heating device when the heat sensor detects a predetermined temperature. A second heat sensor may be placed between a pair of adjacent heat transfer conduits.

14 Claims, 3 Drawing Sheets

DRY FIRE LIMITING DEVICE FOR DEEP FRYER

INTRODUCTION

The present invention relates to a deep fryer, and more particularly, to an improved deep fryer having a dry fire limiting device.

BACKGROUND

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The oil may be heated using a flow of heated gas that is forced or drawn through a heat exchanger having flow passages that are located within or external to the cooking vat. A gas burner is provided to heat the gas circulating within the heat exchanger.

Heat is transferred in the vat predominantly by convection via the shortening. If the shortening is removed from the vat, the remaining air does not act as a sufficient heat transfer agent and the heat exchanger must rise to a significantly higher temperature to transfer the heat being fired into it by the less effective convection via the air, and by radiation. This condition is know as dry firing and results in accelerated failure of the heat exchanger in essentially all cases.

To detect this dryfiring, or overtemperature condition, which occurs when the shortening level in the vat drops, a temperature sensor can be placed in the vat which will trigger a shutoff device to deactivate the heating mechanism when the temperature in the vat reaches a predetermined maximum temperature. If the sensor is placed below the heat exchanger, a partial drain of the shortening could leave the top portion of the heat exchanger uncovered, and, therefore, exposed to excessive heat, while the sensor remains covered by shortening at a suitable temperature. In this case, the sensor would not trigger the heating mechanism to shut off, leading to failure of the top portion of the heat exchanger. Alternatively, the sensor may be placed above the heat exchanger in the area known as the cooking zone of the vat. A problem with locating the sensor in the cooking zone is that it may interfere with the food product and baskets holding food product which are placed in the cooking zone. A sensor located in the cooking zone above the heat exchanger also generally has a poor radiative heat transfer form factor, or angle factor, that is, the fraction of diffuse radiant energy falling on the sensor, relative to the heat exchanger. This results in a poor transfer of heat from the heat exchanger to the sensor. Consequently, it is difficult to get the sensor hot enough to trip and deactivate the heating mechanism under dry fire conditions, while keeping it cool enough to avoid deactivating the heating mechanism during suitable operating conditions. A sensor located at the top of the flow passages of the heat exchanger would necessarily be at the same height as the welds joining the flow passages to the vat, and would also get hot more slowly than the welds since the welds are in close proximity to, or in contact with, the flame from the burner.

It is an object of the present invention to provide a deep fryer with a dry fire limiting device which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a device for limiting dry fire conditions in a deep fryer.

In accordance with a first aspect, a fryer system has a fryer including a vat containing shortening. A heating means supplies heat to the vat. The fryer has a plurality of heat transfer conduits, each conduit having an upper surface, an inlet end and an outlet end. The fryer has at least one mixing plenum, each mixing plenum having an upper surface, a plurality of inlet openings, and a plurality of outlet openings. Each inlet opening is sealingly connected to an outlet end of a heat transfer conduit, and each outlet opening is sealingly connected to an inlet end of a heat transfer conduit. The upper surface of the at least one mixing plenum is above the upper surface of the plurality of heat transfer conduits. A heat sensor is positioned on the upper surface of one of the mixing plenums. The fryer has a means for deactivating the heating means when the heat sensor detects a predetermined temperature.

In accordance with another aspect, a fryer system has a fryer including a vat containing shortening. A heating means supplies heat to the vat. The fryer has a plurality of heat transfer conduits, each conduit having an upper surface, an inlet end and an outlet end. A first mixing plenum has an upper surface, a plurality of inlet openings, and a plurality of outlet openings. Each inlet opening of the first mixing plenum is sealingly connected to an outlet end of a heat transfer conduit, and each outlet opening of the first mixing plenum is sealingly connected to an inlet end of a heat transfer conduit. An upper surface of the first mixing plenum is above the upper surface of the plurality of heat transfer conduits. A second mixing plenum has an upper surface, a plurality of inlet openings, and a plurality of outlet openings. Each inlet opening of the second mixing plenum is sealingly connected to an outlet end of a heat transfer conduit, and each outlet opening of the second mixing plenum is sealingly connected to an inlet end of a heat transfer conduit. An upper surface of the second mixing plenum is above the upper surface of the plurality of heat transfer conduits. A first heat sensor is positioned on the upper surface of one of first and second mixing plenums. A second heat sensor is positioned between a pair of adjacent heat transfer conduits. The fryer has a means for deactivating the heating means when one of the first and second heat sensors detects a predetermined temperature.

In accordance with yet another aspect, a fryer system has a fryer including a vat containing shortening. A heating means supplies heat to the vat. The fryer has a plurality of heat transfer conduits, each conduit having an upper surface, an inlet end and an outlet end. The fryer has at least one mixing plenum, each mixing plenum having at least one inlet opening, each inlet opening sealingly connected to an outlet end of one of the heat transfer conduits, and at least one outlet opening, each outlet opening sealingly connected to an inlet end of one of the heat transfer conduits. A heat sensor is positioned on a surface of one of the mixing plenums at a point higher than the upper surfaces of the heat transfer conduits. The fryer has a means for deactivating the heating means when the heat sensor detects a predetermined temperature.

From the foregoing disclosure, it will be readily apparent to those skilled in the art, that is, those who are knowledgeable or experienced in this area of technology, that the present invention provides a significant technological advance. Preferred embodiments of the invention can provide an efficient and effective way of limiting dry fire conditions in the deep fryer. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
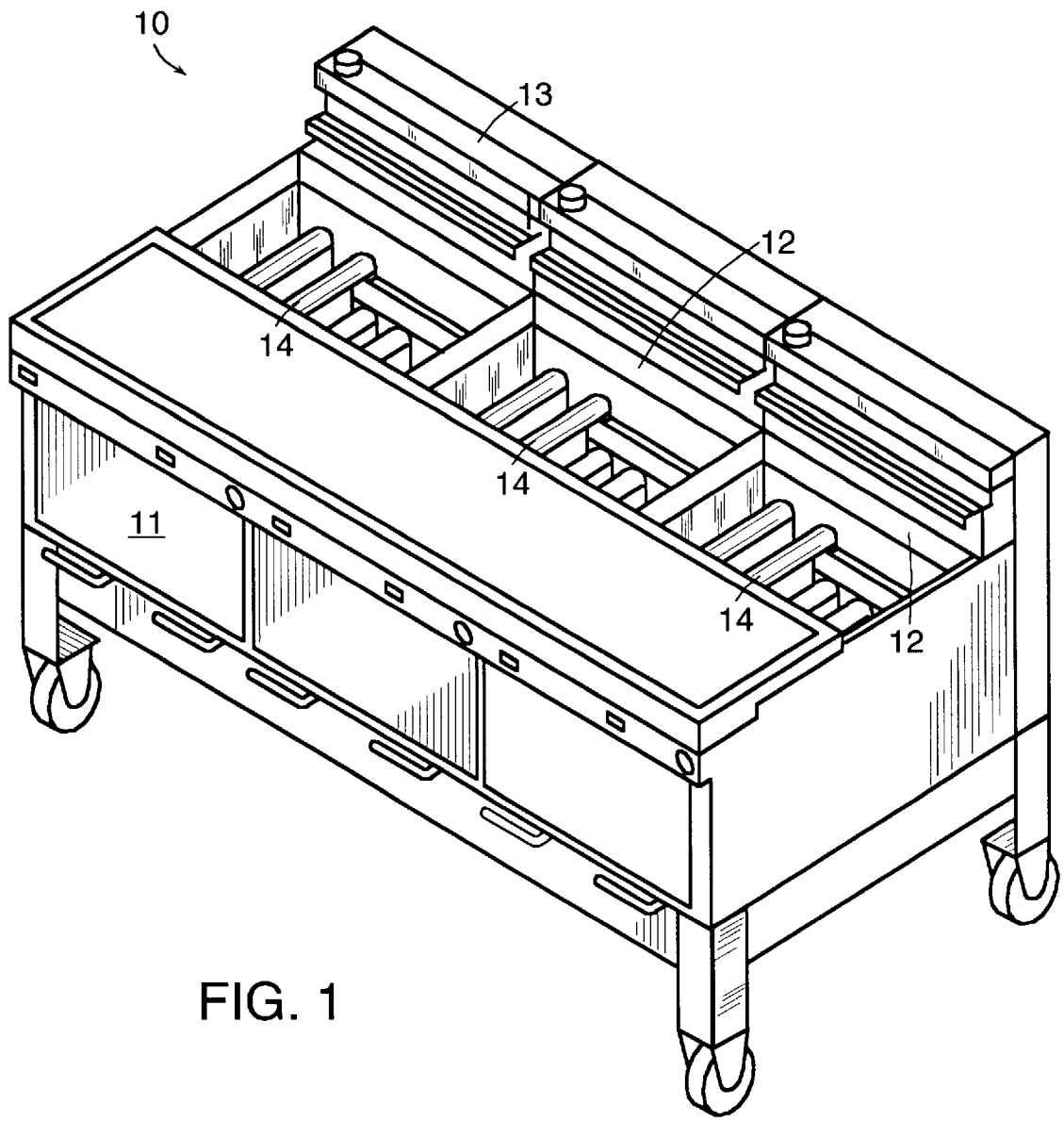
FIG. 1 is a schematic perspective view of a gas fryer containing a heat exchanger according to the present invention.

The figures referred to above are not drawn necessarily to scale and should be understood to present a representation of the invention, illustrative of the principles involved. Some features of the dry fire limiting device depicted in the drawings have been enlarged or distorted relative to others to facilitate explanation and understanding. Dry fire limiting devices, as disclosed herein, will have configurations and components determined, in part, by the intended application and environment in which they are used.

DETAILED DESCRIPTION OF CERTAIN PREFERRED EMBODIMENTS

Figure 2:
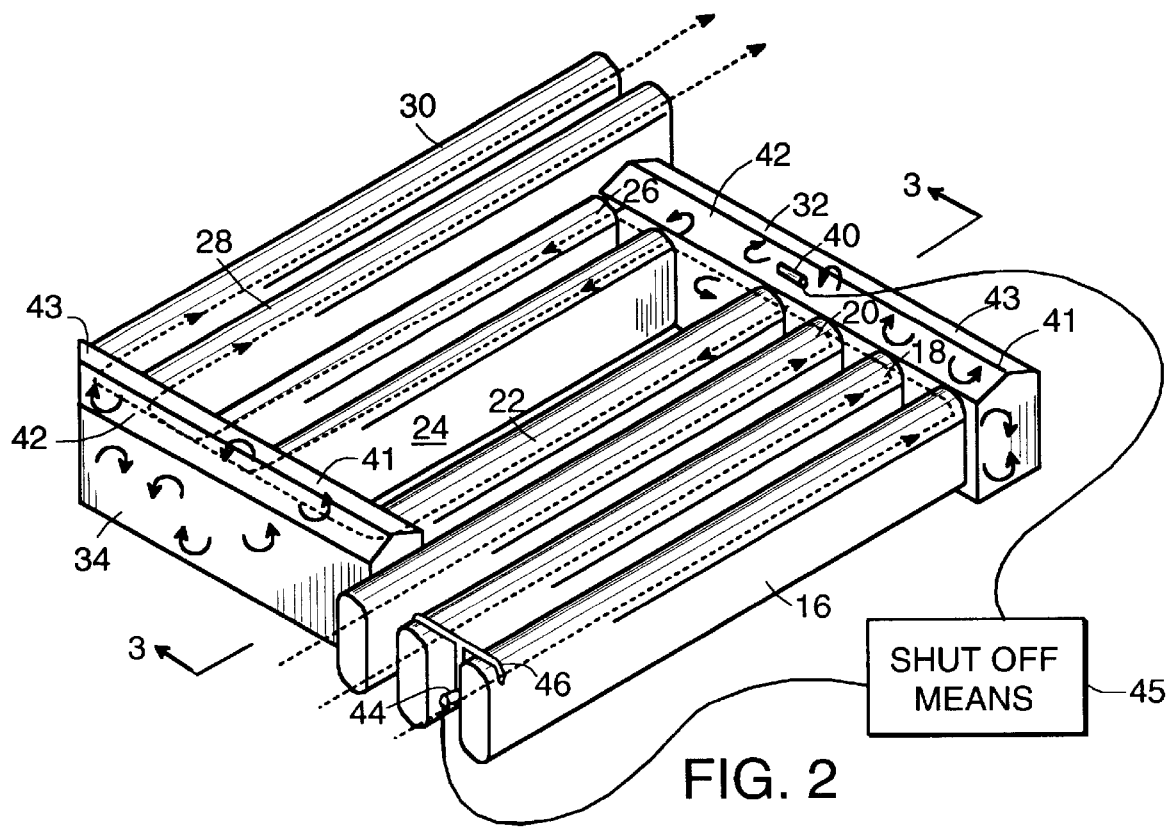
FIG. 2 is a schematic perspective view of the heat exchanger shown in FIG. 1 showing two temperature sensors according to the present invention.

Referring to FIG. 1, a gas fryer according to the present invention is shown generally by reference numeral 10. The gas fryer preferably includes a plurality of vats 12 for holding the shortening, oil, or other cooking medium, a heat exchanger 14 for heating the shortening in each vat 12, a burner section 11 for heating the fluid flowing through heat exchanger 14, and may include a blower motor in blower housing 13 for drawing the heated fluid through heat exchanger 14. Due to its efficiency and economic availability, the heat exchange fluid generally used in the present invention and in prior art gas fryers is air; however, other gaseous fluids or liquids may of course also be considered as the development thereof permits. In the preferred embodiment of FIG. 2, heat exchanger 14 includes a plurality of heat transfer conduits or tubes 16, 18, 20, 22, 24, 26, 28, 30, each having an inlet end and an outlet end. Mixing plenums 32, 34 each have a plurality of inlet openings and outlet openings. Each inlet opening of mixing plenums 32, 34 is sealingly connected to an outlet end of a corresponding heat transfer conduit. Each outlet opening of mixing plenums 32, 34 is sealingly connected to an inlet end of a corresponding heat transfer conduit. The direction of travel of the heated fluid through heat exchanger 14 is schematically illustrated in FIG. 2 to show the heated fluid entering the vat through inlet heat transfer tubes 16, 18, 20, mixing in plenum 32, passing through heat transfer tubes 22, 24, 26, mixing in plenum 34, and then exiting the vat through outlet heat transfer tubes 28, 30. The critical welds of the heat exchanger, which are the worst victims of dry firing, are at the inlet ends of the inlet heat exchanger tubes 16, 18, 20 where they are connected to the sidewalls of the vat (not shown), especially at the top portions thereof. This is due to the fact that the flame from burner 11 is in closest proximity to heat exchanger 14 at this area. A grill 48, seen in FIG. 3, upon which the product or basket holding the product is placed, rests on the upper edges 41 of plenums 32, 34. In a preferred embodiment of the present invention, gas fryer 10 includes a vat 12 having internal dimensions of 20"×20", 18"×18", or 14"×14", although any other desired dimensions could also be used. Heat exchanger 14 is therefore correspondingly sized to be disposed within vat 12. A further description of the heat exchanger is provided in U.S. Pat. Nos. 5,417,202 and 5,706,717, assigned on their faces to America's Favorite Chicken Company (AFC), the entire contents of which are hereby incorporated by reference.

Figure 3:
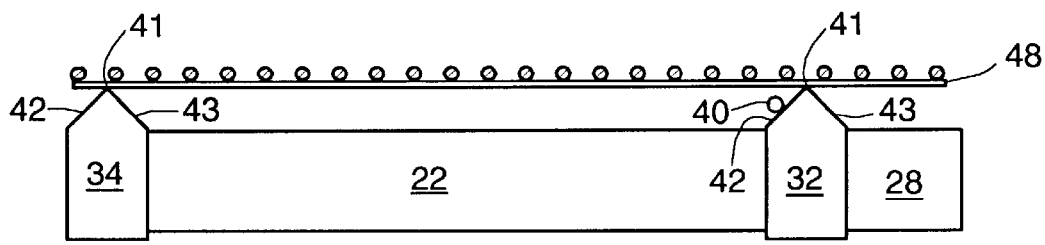
FIG. 3 is a schematic elevation view showing a temperature sensor of the present invention positioned atop a mixing plenum of the heat exchanger of FIG. 2.

As seen in FIG. 3, upper edges 41 of mixing plenums 32, 34 are positioned above the top surfaces of heat transfer tubes 16, 18, 20, 22, 24, 26, 28, and 30. In certain preferred embodiments, the upper edges 41 of plenums 32, 34 are approximately one inch above the top surface of the heat transfer tubes 16, 18, 20, 22, 24, 26, 28, and 30. The upper surface of plenums 32, 34 is formed of a first sloped surface 42 and a second sloped surface 43 which are joined together at upper edge 41.

A temperature sensor 40 is located on first sloped surface 42 of mixing plenum 32. Temperature sensor 40 is connected to a shutoff means 45 which deactivates burner 11 when a predetermined temperature is reached. Sensor 40 may be a mechanical type sensor, such as a bulb and capillary device, mechanically linked to a switch, or an electronic type sensor which sends an electronic signal to a computer which controls heat exchanger 14, or other suitable means which will become obvious to those skilled in the art given the benefit of this disclosure. Such a sensor may also be used to activate a display indicating to an operator the status of heat exchanger 14. The mixing plenums 32, 34 in fryer 10 reach temperatures hotter than those encountered in heat transfer tubes 16, 18, 20, 22, 24, 26, 28, 30 due to the fact that the additional turbulence created in the mixing plenums enhances the heat transfer. Mixing plenums 32, 34, consequently, get hot quickly in a dry firing condition. Since sensor 40 is located on first sloped surface 42 of mixing plenum 32, it will reach a predetermined design temperature and cause a shutdown of the burner via shutoff means 45 before that same design temperature is reached in the heat transfer tubes, therefore preventing any of the critical welds on the heat transfer tubes from reaching a critical temperature.

Such heat exchangers typically have a process control sensor which maintains the set point temperature of the shortening, and a separate sensor for sensing a maximum temperature of the shortening with a control means for shutting off the heat exchanger when that maximum temperature is reached. The control means for shutting off the heat exchanger based on a maximum temperature of the shortening may, in certain preferred embodiments, be combined with shutoff means 45 as a single controller. Thus, if the shortening level dropped, sensor 40 would reach its set point temperature and trigger shutoff means 45 to deactivate burner 11, or, if the sensor in the shortening reached its set point maximum temperature, it would trigger shutoff means 45 to deactivate burner 11.

In certain preferred embodiments of the present invention, the design temperature may be 450° F., which is within 100° F. of the typical 350° F. operating temperature of the shortening.

Locating sensor 40 on top surface 42 of mixing plenum 32 allows sensor 40 to be positioned beneath grill 48, and, thus, avoids any interference with food product, or baskets containing food product, in the cooking zone. By locating sensor 40 near the top of mixing plenum 34, it is advantageously located near the highest point of heat exchanger 14. Consequently, sensor 40 can detect high temperatures and shutoff means 45 will deactivate burner 11 in both a condition where vat 12 contains no shortening at all, and a condition where the shortening level is above the top of the heat transfer tubes but below the uppermost edge 41 of the mixing plenums.

Figure 4:
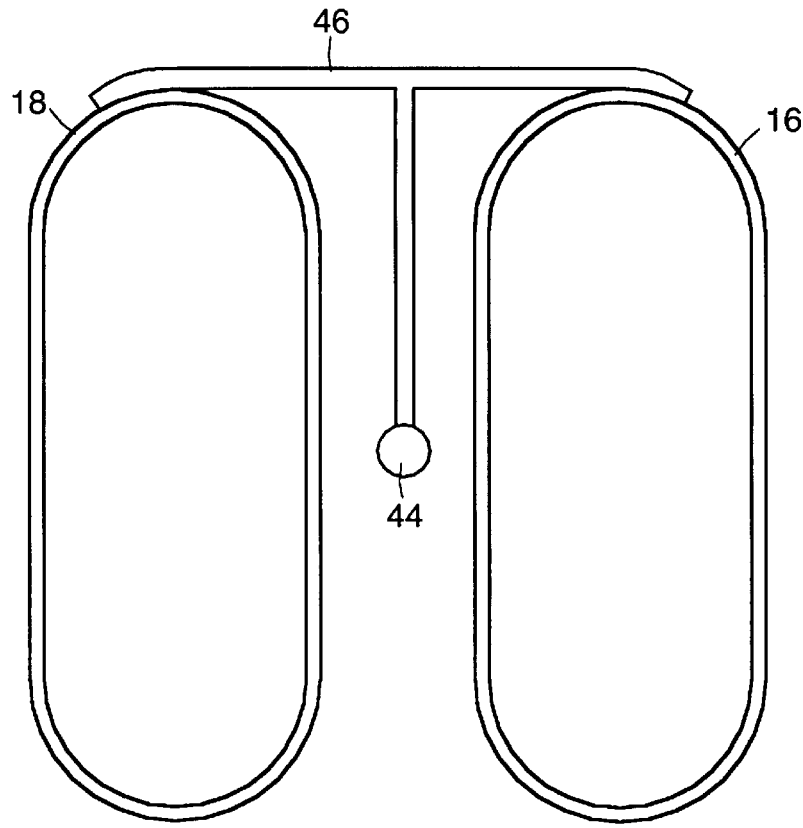
FIG. 4 is a schematic elevation view showing a temperature sensor of the present invention positioned between a pair of heat transfer conduits of the heat exchanger of FIG. 2.

In another preferred embodiment, an additional sensor 44 may be placed between two heat transfer tubes, such as inlet heat transfer tubes 16, 18 as illustrated in FIGS. 1 and 4. Sensor 44 may be suspended between heat transfer tubes 16, 18 by support member 46. Sensor 44 is preferably in close proximity to, e.g. a few inches from, the sidewall of vat 12, near the firebox containing burner 11, to reduce the possibility of hot spots which may ignite or scorch the shortening. When vat 12 is empty of shortening, the primary heat transfer mechanism is radiation. Sensor 44 is preferably positioned such that it is equidistant from the sidewalls of heat transfer tubes 16, 18 and midway along their vertical height. Locating sensor 44 in this position will maximize the exposure of sensor 44 to the radiative heat transfer from the sides of heat transfer tubes 16, 18, especially when heat transfer tubes 16, 18 have an oblong, or obround cross-section, as seen in the embodiment illustrated in FIG. 4. It is to be appreciated that heat transfer tubes 16, 18, 20, 22, 24, 26, 28, 30 may have circular cross-sections or other suitable shaped cross-sections. In a dry fire condition where there is no shortening in the vat, sensor 44 may reach the design temperature before sensor 40 due to the fact that sensor 44 is located closer to the firebox.

Figure 5:
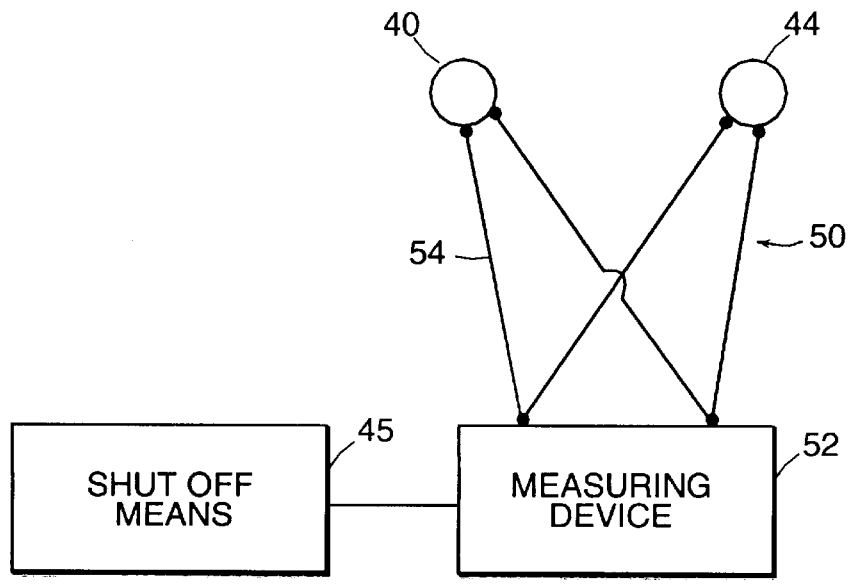
FIG. 5 is a schematic representation of a thermocouple of the present invention incorporating a pair of temperature sensors and being connected to the shut off means of FIG. 1.

In a preferred embodiment, sensors 40 and 44 are thermocouples, and are connected to shutoff means 45 in series. In another preferred embodiment, shown in FIG. 5, a thermocouple 50 comprises measuring device 52 connected by wires 54 to sensors 40 and 44. Thus, sensors 40 and 44 are connected to measuring device 52 in parallel, with sensor 40 and sensor 44 each forming a hot junction of thermocouple 50. In operation, measuring device 52 senses the average temperature of sensors 40 and 44, and sends a signal to shutoff means 45 when the average sensed temperature exceeds a predetermined value. In this manner, shutoff means 45 will deactivate burner 11 based on a sensed condition of either sensor 40 or sensor 44, or both. In a situation where there is no shortening in vat 12, sensor 44 will most likely reach its set point temperature more quickly than sensor 40, driving the average temperature to a point at which measuring device 52 will trigger shutoff means 45 to deactivate burner 11. In a situation where the shortening only partially covers the heat transfer tubes, sensor 40 will most likely reach its set point before sensor 44, driving the average temperature to the set point of measuring device 52.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

I claim:

1. A fryer system comprising, in combination:
   a fryer including a vat for containing shortening therein;
   a heating means supplying heat to the vat;
   a plurality of heat transfer conduits, each conduit having an upper surface, an inlet end and an outlet end;
   at least one mixing plenum, each mixing plenum having an upper surface, at least one inlet opening, each inlet opening sealingly connected to an outlet end of one of the heat transfer conduits, and at least one outlet opening, each outlet opening sealingly connected to an inlet end of one of the heat transfer conduits, the upper surface of the at least one mixing plenum being above the upper surface of each of the plurality of heat transfer conduits;
   a heat sensor positioned on the upper surface of one of the mixing plenums; and
   a means for deactivating the heating means when the heat sensor detects a predetermined temperature.

2. A fryer system according to claim 1, further comprising an additional heat sensor positioned between side walls of a pair of adjacent heat transfer conduits.

3. A fryer system according to claim 2, wherein the additional heat sensor is located proximate inlet ends of the pair of heat transfer conduits and proximate a sidewall of the vat.

4. A fryer system according to claim 2, wherein the heat sensor and the additional heat sensor are thermocouples.

5. A fryer system according to claim 2, further comprising a thermocouple having two hot junctions, wherein the heat sensor and the additional heat sensor each form a hot junction of the thermocouple.

6. A fryer system according to claim 2, wherein the additional heat sensor is equidistant from the adjacent heat transfer conduits.

7. A fryer system according to claim 2, wherein the additional heat sensor is positioned midway along the vertical height of the adjacent heat transfer conduits.

8. A fryer system according to claim 1, wherein the upper surface of the at least one mixing plenum comprises a first sloped portion and a second sloped portion, the sensor being positioned on one of the first and second sloped portions.

9. A fryer system comprising, in combination:
   a fryer including a vat for containing shortening therein;
   a heating means supplying heat to the vat;
   a plurality of heat transfer conduits, each conduit having an upper surface, an inlet end and an outlet end;
   a first mixing plenum having an upper surface, a plurality of inlet openings, each inlet opening sealingly connected to an outlet end of one of the heat transfer conduits, and a plurality of outlet openings, each outlet opening sealingly connected to an inlet end of one of the heat transfer conduits, an upper surface of the first mixing plenum being above the upper surface of the plurality of heat transfer conduits;
   a second mixing plenum having an upper surface, a plurality of inlet openings, each inlet opening sealingly connected to an outlet end of one of the heat transfer conduits, and a plurality of outlet openings, each outlet opening sealingly connected to an inlet end of one of the heat transfer conduits, an upper surface of the second mixing plenum being above the upper surface of the plurality of heat transfer conduits;
   a first heat sensor positioned on the upper surface of one of the first and second mixing plenums;
   a second heat sensor positioned between a pair of adjacent heat transfer conduits; and
   a means for deactivating the heating means when one of the first and second heat sensors detects a predetermined temperature.

10. A fryer system according to claim 9, wherein the second heat sensor is located proximate inlet ends of the pair of heat transfer conduits and proximate a sidewall of the vat.

11. A fryer system according to claim 9, wherein the first and second heat sensors are thermocouples.

12. A fryer system according to claim 9, further comprising a thermocouple having two hot junctions, wherein the first and second heat sensors each form a hot junction of the thermocouple.

13. A fryer system according to claim 9, wherein the upper surface of the first and second mixing plenums each comprise a first sloped portion and a second sloped portion, the sensor being positioned on one of the first and second sloped portions of one of the first and second mixing plenums.

14. A fryer system comprising, in combination:

a fryer including a vat for containing shortening therein;

a heating means supplying heat to the vat;

a plurality of heat transfer conduits, each conduit having an upper surface, an inlet end and an outlet end;

at least one mixing plenum, each mixing plenum having at least one inlet opening, each inlet opening sealingly connected to an outlet end of one of the heat transfer conduits, and at least one outlet opening, each outlet opening sealingly connected to an inlet end of one of the heat transfer conduits, a heat sensor positioned on a surface of the at least one mixing plenum at a point higher than the upper surfaces of the heat transfer conduits; and a means for deactivating the heating means when the heat sensor detects a predetermined temperature.

\* \* \* \* \*